United States Patent
Braune et al.

(10) Patent No.: US 7,578,156 B2
(45) Date of Patent: Aug. 25, 2009

(54) SAFETY METHOD AND SAFETY DEVICE FOR A MACHINE, ESPECIALLY A BENDING PRESS

(75) Inventors: Ingolf Braune, Gundelfingen (DE);
Roland Bergbach, Kenzingen (DE);
Joerg Grabinger, Emmendingen (DE)

(73) Assignee: Sick AG, Waldkirch (DE)

( * ) Notice: Subject to any disclaimer, the term of this patent is extended or adjusted under 35 U.S.C. 154(b) by 0 days.

(21) Appl. No.: 10/579,133

(22) PCT Filed: Aug. 10, 2004

(86) PCT No.: PCT/EP2004/008915

§ 371 (c)(1),
(2), (4) Date: Dec. 18, 2006

(87) PCT Pub. No.: WO2005/052437

PCT Pub. Date: Jun. 9, 2005

(65) Prior Publication Data

US 2007/0214854 A1    Sep. 20, 2007

(30) Foreign Application Priority Data

Nov. 14, 2003    (DE) ................................ 103 53 353

(51) Int. Cl.
*B21C 51/00* (2006.01)
(52) U.S. Cl. .......................................... 72/31.11; 72/37
(58) Field of Classification Search .................. 72/3,
72/4, 31.01, 31.11, 31.1, 37, 20.1, 20.2, 21.3,
72/389.3; 192/130; 100/341, 342, 348
See application file for complete search history.

(56) References Cited

U.S. PATENT DOCUMENTS 5,579,884 A    12/1996 Appleyard et al.

(Continued)

FOREIGN PATENT DOCUMENTS

DE    19604900 C2    8/1997

(Continued)

OTHER PUBLICATIONS

Fiessler, G.; "Muting, Balnking u. Co."; *electroAUTOMATION*; 2002; printed out Feb. 18, 2004; http://www.ea-online.de/O/35/Y/82712/VI/2560715/default.aspx?O=35&Y=82712&V...; 2 pages.

*Primary Examiner*—Dana Ross
*Assistant Examiner*—Teresa Bonk
(74) *Attorney, Agent, or Firm*—Townsend and Townsend and Crew, LLP

(57) ABSTRACT

A potentially dangerous machine is secured to protect against injuries and has first and second tool parts that define an opening gap between them. At least the first tool part is movable relative to the second tool part in a movement direction during an operating cycle for deforming a workpiece between them by reducing a size of the opening gap in the movement direction. The protected zone precedes the first tool part and extends over at least a portion of the opening gap in the direction of relative movement. The protected zone is monitored with an optoelectronic sensor, and a danger signal is generated in response to a breach of the protected zone. When the size of the opening gap in the movement direction becomes smaller than the protected zone, the size of the protected zone is correspondingly reduced until during subsequent closing movements of the first tool part substantially the entire opening gap is within the protected zone.

12 Claims, 7 Drawing Sheets

U.S. PATENT DOCUMENTS

2002/0017603 A1* 2/2002 Haberer et al. .............. 250/221
2002/0104958 A1* 8/2002 Fiessler ...................... 250/221
2003/0062469 A1* 4/2003 Braune et al. ............... 250/221

FOREIGN PATENT DOCUMENTS

| | | | |
|---|---|---|---|
| DE | 10138223 | A1 | 2/2003 |
| DE | 10143505 | A1 | 3/2003 |
| EP | 1291573 | A2 | 3/2003 |
| WO | WO 00/67932 | A1 | 11/2000 |
| WO | WO 2004/079255 | A1 | 9/2004 |

* cited by examiner

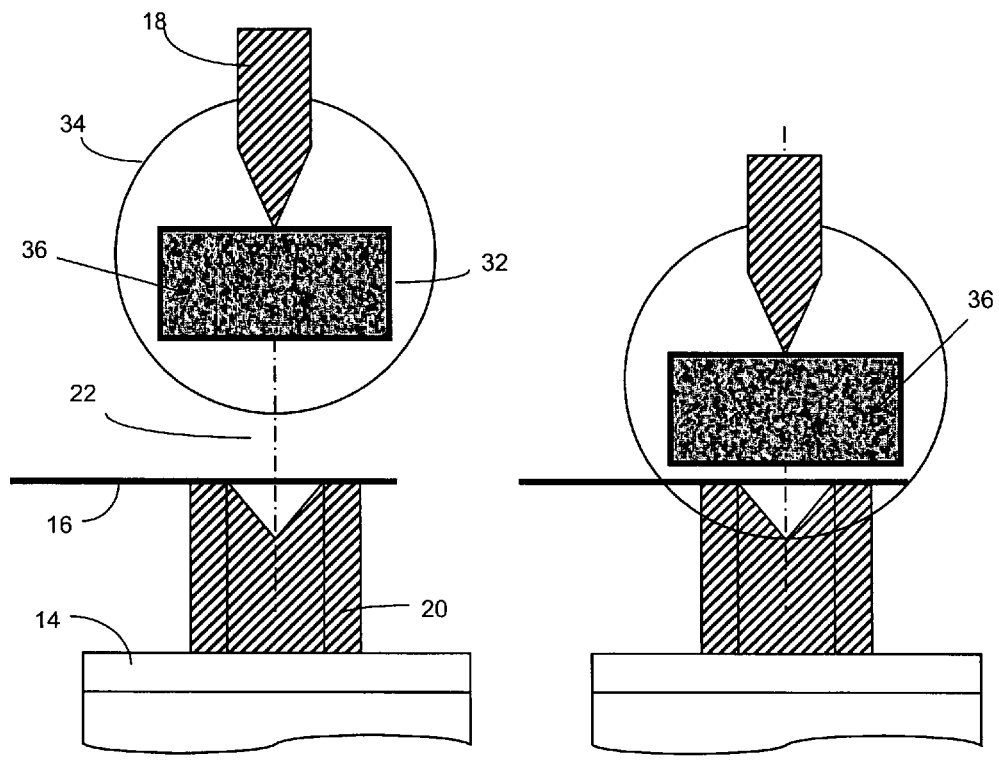
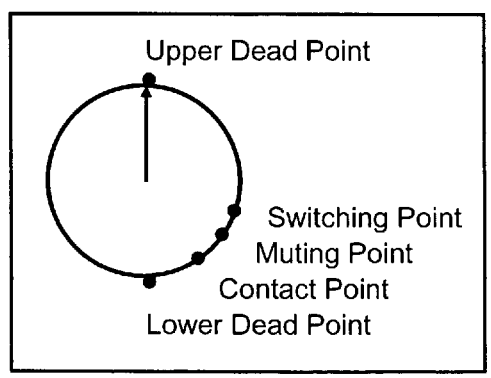
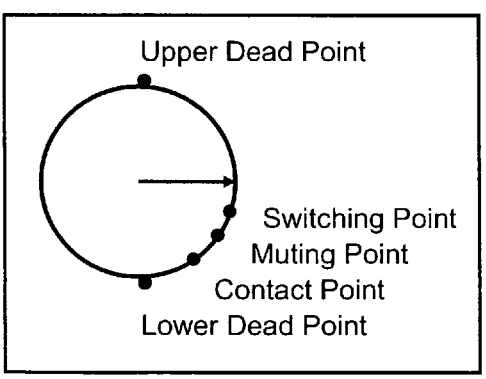
Fig. 2a　　　　　　　　Fig. 2b

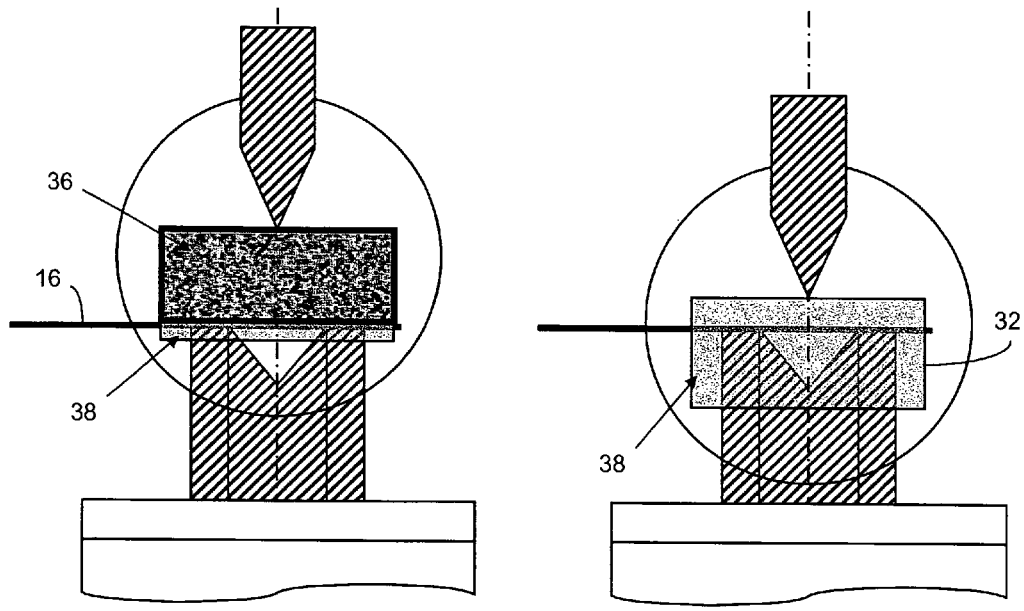
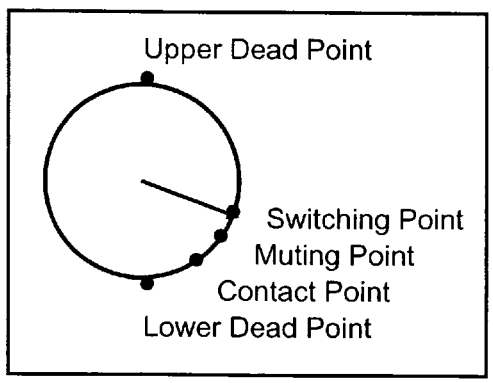
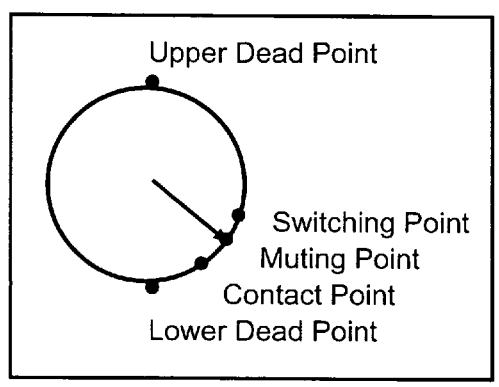
Fig. 2c
Fig. 2d

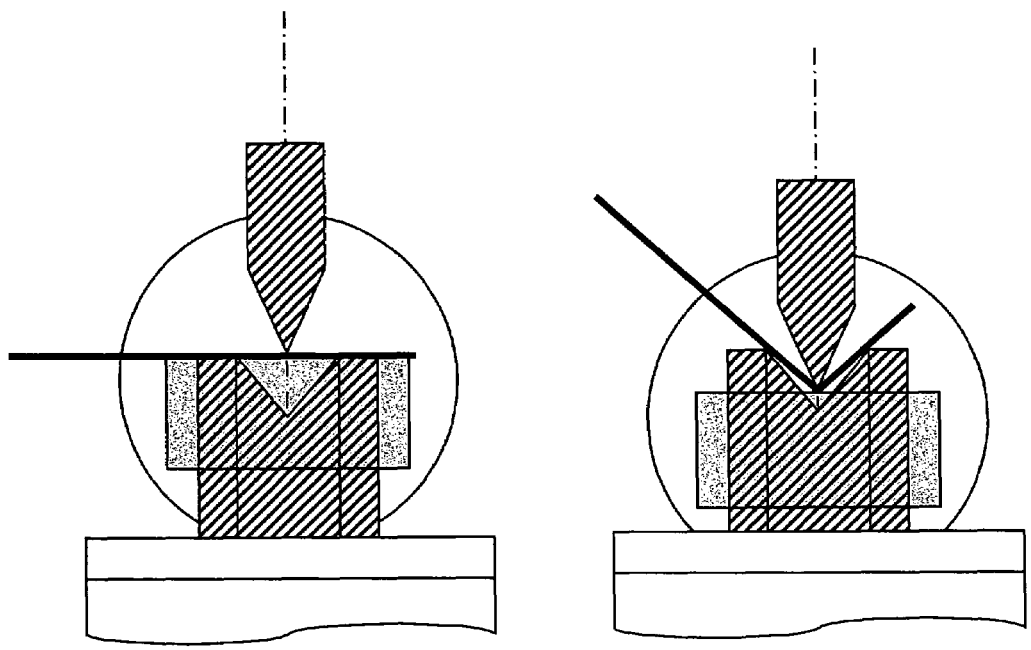
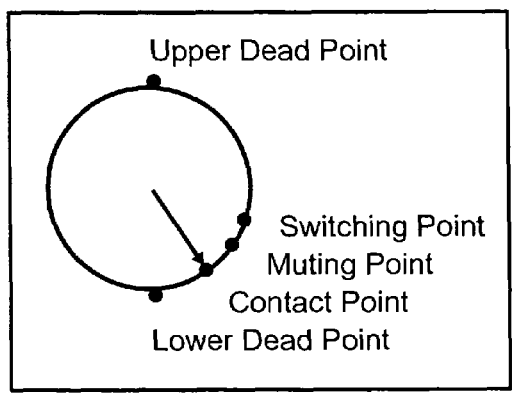
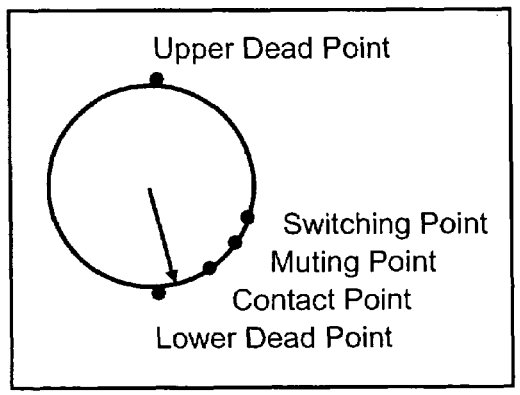
Fig. 2e        Fig. 2f

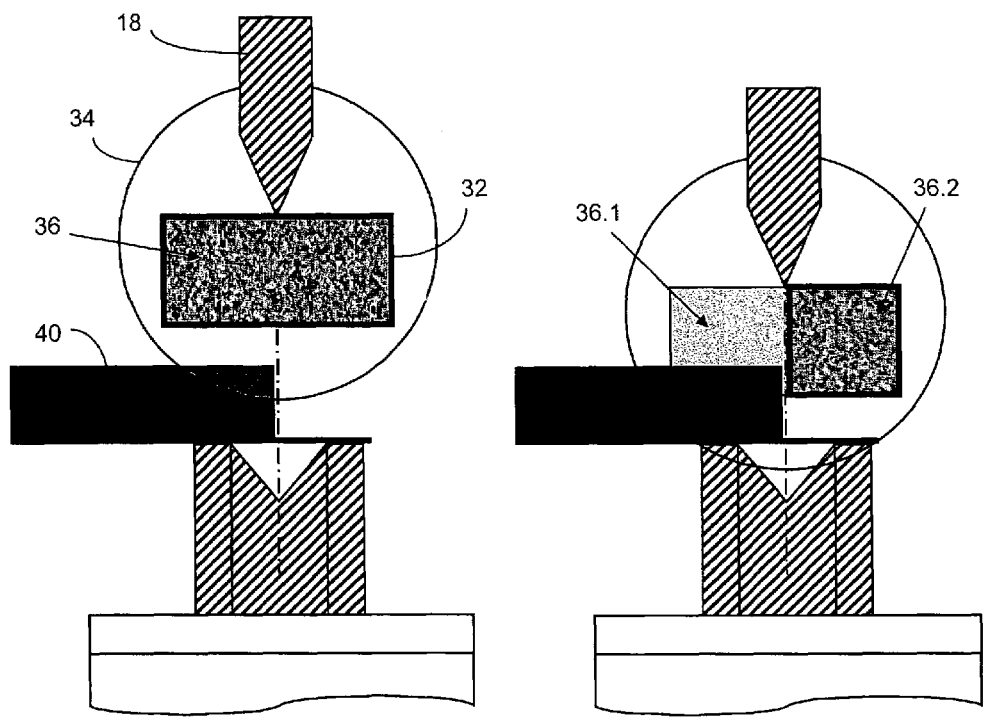
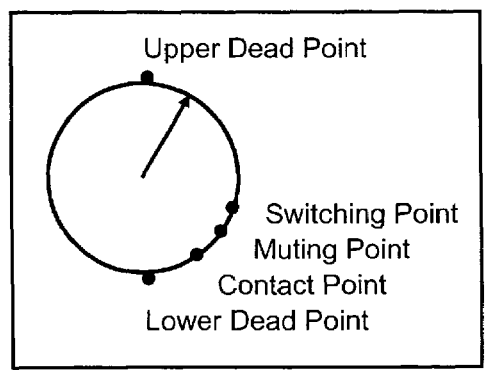
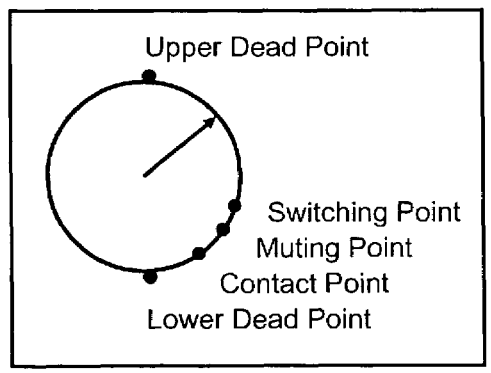
Fig. 3a
Fig. 3b

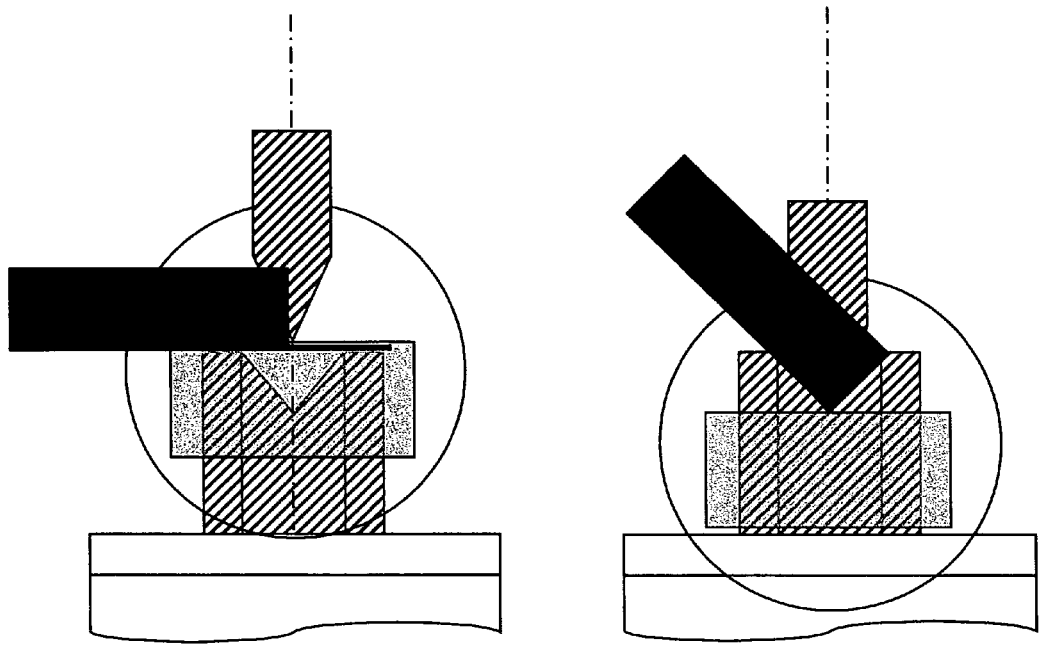
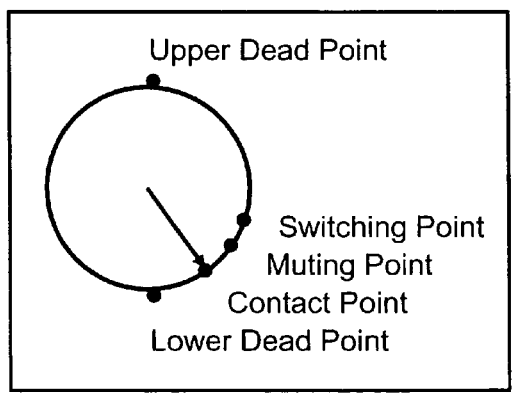
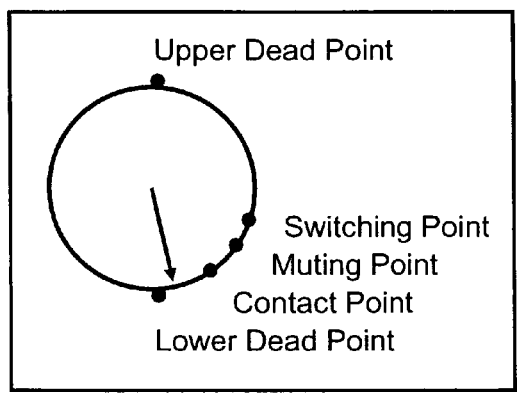
Fig. 3e                                              Fig. 3f

SAFETY METHOD AND SAFETY DEVICE FOR A MACHINE, ESPECIALLY A BENDING PRESS

RELATED APPLICATIONS

This application is based on PCT Application PCT/EP 2004/008915 filed Aug. 10, 2004 and further claims the priority of German application No. 103 53 353.2 filed Nov. 14, 2003, and the disclosures thereof are incorporated herein by reference.

BACKGROUND OF THE INVENTION

The present invention relates to a method and apparatus for securing machines, such as bending presses, against unwanted entries for preventing possible injuries.

The present invention is not limited for use in connection with bending presses and can equally be used on edging presses, punching machines, cutting machines and similar devices which have parts and components that execute potentially dangerous movements during a work cycle of the machine. Bending presses shape workpieces primarily by pressing them with a bending die against an opposing die or mold. The desired shape of the workpiece is attained by appropriately shaping the bending die and the associated mold. Frequently the bending die is a tool which is mounted on a first, movable machine part, while the mold is mounted in a second, fixed machine part. However, only the relative motions between the machine parts are important and, as an alternative, the mold can be movable or the die and mold can both move towards and away from each other. The safety system of the present invention can be used on all such machines.

It is well known that bending presses constitute a significant danger for operating personnel, especially danger of injury from tissue damage all the way up to the severance of body parts. It has been known for a long time that bending presses and the like must be protected with safety devices to prevent accidents. For example, German published patent application DE 010 38 223 A1 discloses a light grid safety system for a press. The light grid is formed by several individual light beams that are programmed and coupled to the movable tool part so that during a dangerous movement of a workpiece, only those light beams are activated which secure the zone beneath the moving tool part. The active zone of the light grid moves with the movement of the tool. When one of the light beams is interrupted, movement of the first tool part is stopped.

U.S. Pat. No. 5,579,884 discloses a light grid arrangement in which there are two or three light beams that are parallel to and run ahead of the leading edge of the bending die. When one of the light beams is interrupted, movement of the bending die is stopped. When only two light beams are used, they are arranged symmetrically on the frontal side of the machine, that is, on the side of the machine where the operator is located, and towards the aft, that is, the side of the machine remote from the operator. The same is true when three light beams are used, in which event the third light beam is accurately located beneath the leading edge of the bending die and has a greater spacing from the bending die than the two other light beams. In the arrangement of U.S. Pat. No. 5,579,884, the third light beam is primarily a control beam which prevents that a so-called muting point is set too low. The muting point (which means a point where the safety system is temporarily deactivated) occurs when, during a working cycle of the machine, the light beams of the safety device are temporarily deactivated. Without such temporary deactivation, the working cycle would not be completed when the workpiece being worked causes an interruption of a light beam.

SUMMARY OF THE INVENTION

It is therefore an object of the present invention to provide an improved method and apparatus for securing machines in the form of a safety system that assures safety during specific motions and particularly during the dangerous die closing movements of a bending press.

In accordance with the method of the present invention, such a machine, for example a bending press, has a first tool part which moves in the direction of a second tool part so that, during the operational movement, an opening gap between the two tool parts gradually closes. An optoelectronic sensor monitors a safety zone which precedes, that is, extends forward (in the direction of movement) of, the first tool part and monitors at least a portion of the opening gap so that, in the event the safety zone is breached, for example by an intruding hand or head of a person, a switching signal is generated which can be used for stopping the first tool part. In accordance with the invention, the entire (cross-sectional) surface area of the safety zone, but at least its outer border or periphery, are controlled. As the machine goes through an operating cycle, for example for bending a workpiece, the size of the opening gap becomes less relative to the size of the protected zone, and the protected zone is correspondingly reduced during movement of the first tool part in the movement direction towards the second tool part so that during further closing movements of the tool part substantially the entire opening gap is within the protected zone. A principal advantage of the present invention is that towards the end of an operating cycle the protected zone is given the largest possible size to provide optimal security and protection. Thus, as the opening gap becomes smaller in the direction of movement than the protected zone, the protected zone is not deactivated (or muted), but instead the protected zone together with the opening gap is continuously reduced in size. Since the entire surface of the protected zone is monitored, an optimal protection is assured because the entire opening gap is monitored, especially during the final phases of the operating cycle when danger is greatest because the opening gap is about to close.

In contrast to conventional safety arrangements, which use individual light barriers having individual light beams, monitoring the full cross-sectional surface area of the protected zone assures that the entire three-dimensional protected zone is fully monitored. As contrasted with fully monitored systems using expanded light beams that are monitored, as known from EP 1 198 308, for example, continuously fitting the protected zone to the shrinking size of the opening gap assures an optimal monitoring of the machine, especially towards the final, most dangerous phases of its operating cycle.

In one embodiment, the protected zone is entirely deactivated shortly before the opening gap closes completely after the gap has become so small so that no serious danger of injury remains, for example when the opening gap has a size which is so small that the finger of a person can no longer be extended into it.

It is advantageous to set the operating speed of the first tool part by providing a first, faster closing speed which is followed by a second, slower closing speed. The switch from the first to the second closing speed is preset and predetermined on the basis of an initial test run or cycle of the moving tool part on the basis of predetermined required die deceleration ramps or stopping distances.

For example, by intelligently sensing and using the light received by the light receiver, and depending on the size and/or geometric form of the workpiece, it is possible to deactivate at least part of the protected zone. This permits differently sized and/or shaped workpieces to be worked on on the machine and makes it possible, for example, to use the bending press for bending boxes.

Preferably, and to assure the largest possible protection, such a part of the protected zone is deactivated only after the workpiece has entered the protected zone during an operating cycle.

It is preferred to determine the so-called contact point for the first tool part on the basis of its position relative to the upper surface of the workpiece during an operational test run. In this manner, the point during the operating cycle when the workpiece enters the protected zone is known.

A safety system constructed in accordance with the invention includes an optoelectronic sensor with a light emitter for illuminating the protected zone, a light receiver for detecting the emitted light, and a control and processing unit for generating a switching signal that can be used, for example, for arresting further movement of the tool part in the event the protected zone has been breached, for example when the hand of an operator extends into the protected zone. The light emitter illuminates the complete surface of the protected zone.

The light emitter and light receiver are configured so that when the size of the opening gap has been reduced to the size of the protected zone in the direction of movement, further movement of the tool part and a further reduction in the size of the opening gap result in a corresponding size reduction of the protected zone. Consequently, during further closing movements, the entire opening gap remains substantially within the protected zone.

Since the entire surface of the protected zone is monitored, which means that the monitored area is relatively large, and the light receiver is always completely illuminated, the safety system of the present invention is relatively insensitive to possible misalignments of the optical system such as may be caused, for example, by vibrations. This is particularly true when the cross-section of the emitted light at the light receiver is larger than the light receiver.

The sensor is preferably fixedly mounted to the first tool part and moves with it during the entire working cycle. This assures that the protected zone and the first tool part precisely align.

The light sensor is preferably a position resolving sensor and preferably a matrix-like CMOS-receiver.

Preferred embodiments of the invention are further described below with reference to the drawings.

BRIEF DESCRIPTION OF THE DRAWINGS

FIGS. 2*a*-2*f* are schematic side elevational views of parts of the bending press shown in FIG. 1 and illustrate the press in various phases of a normal work cycle; and FIGS. 3*a*-3*f* are schematic side elevational views of parts of the bending press shown in FIG. 1 and illustrate various phases of a work cycle in a box bending mode.

DESCRIPTION OF THE PREFERRED EMBODIMENTS

Figure 1:
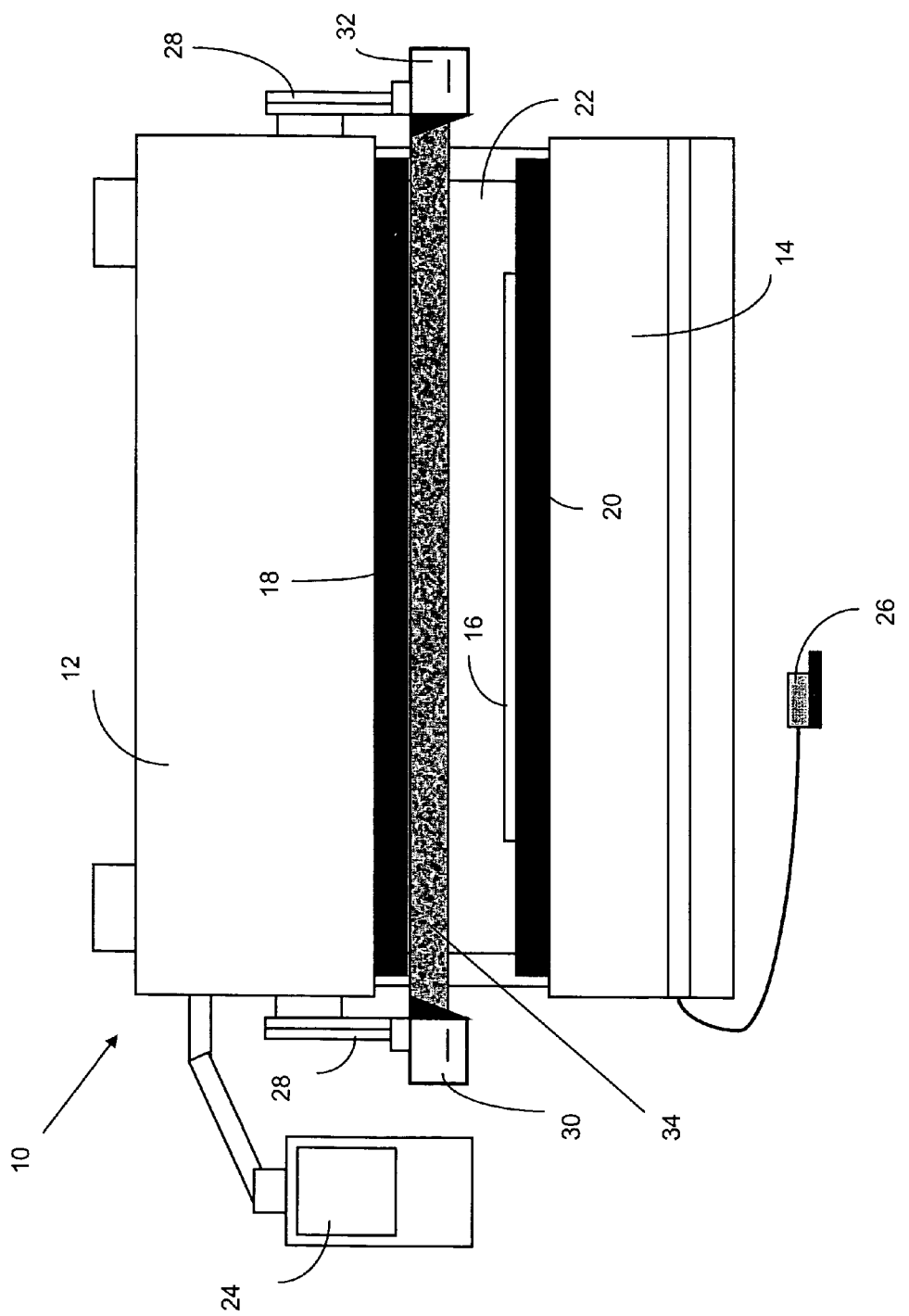
FIG. 1 is a schematic front elevational view of a bending press.

Referring to FIG. 1, a bending press 10 with downstroke operation has an upper die 10 which, during a working cycle, moves vertically downwardly towards a lower die 14 and a workpiece 16 supported on the lower die. The upper and lower dies 12, 14 have respective die edges 18, 20 of the desired shape for bending the workpiece into a particular form. During an active operating cycle, an open gap 22 between the upper die 12 and workpiece 16 gradually diminishes in size. A control unit 24 is provided for controlling bending press 12, which might be activated, for example, with the help of a foot pedal 26.

A holding arm is arranged at the respective ends of upper die 12. The holding arms 28 carry a light emitter 30 and a position resolving light receiver 32 at respective longitudinal ends of upper die 12 and are components of an optoelectronic sensor. Light emitter 30 includes a light source, such as a laser diode and a transmission optic (not shown), which enlarges the emitted light into a light beam 34. Light receiver 32 includes a CMOS-matrix receiver which is illuminated by light beam 34.

Figure 3C:
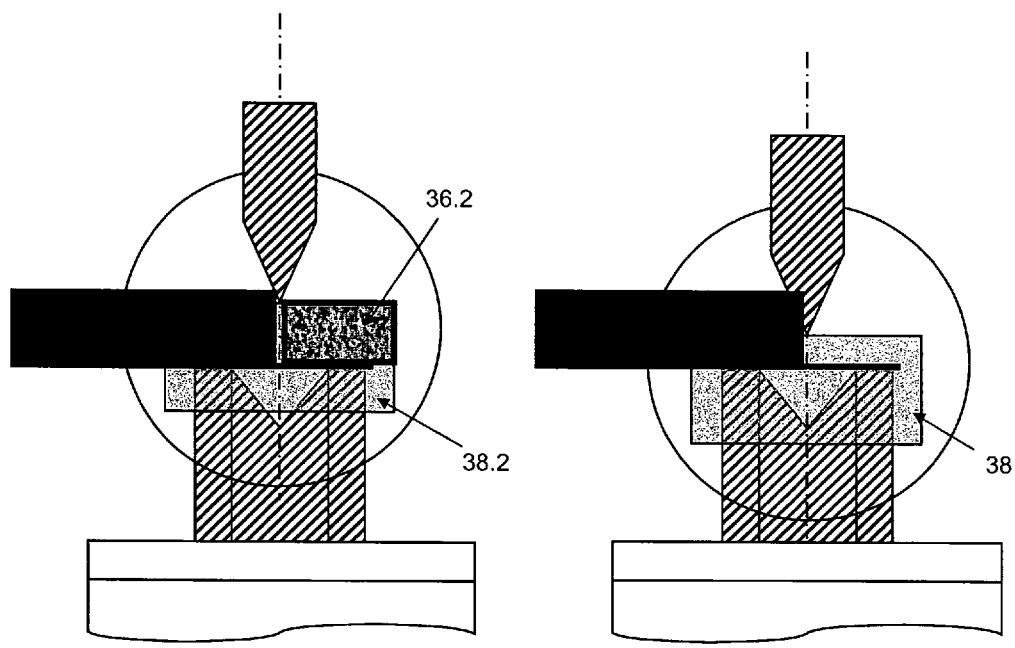
Figure 3C:
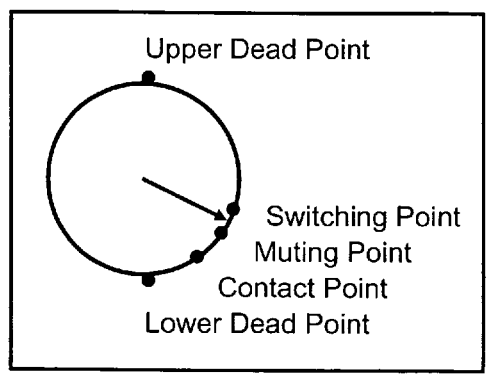

Light beam 34 extends along lower die edge 18 of the upper die 12 across the open gap 22. As is shown in FIGS. 2 and 3, light beam 34 is enlarged so that it completely illuminates the preferably rectangular light receiver 32. At the point where light beam 34 impacts light receiver 32, the cross-section of the light beam is preferably greater than the light-sensitive surface of the light receiver to assure that the receiver is completely illuminated even during vibrations or minor misalignments of the receiver. As is seen in FIGS. 2 and 3, which show a circular light beam 34, the beam completely covers the rectangular receiver 32 and even extends past its sides.

The active part of receiver 32 (which is shown in FIGS. 2 and 3 in a speckled dark gray) defines a three-dimensional protected zone 36 within light beam 34 between upper die 12 and lower die 14 as is further described below. A sensor which includes a control and processing unit, which may be part of the overall control for the machine, detects an interruption of light beam 34 within the protected zone 36 and generates a switching or control signal when such an interruption of the light beam is detected. The control signal is used, for example, to arrest the motion of upper die 12 and protect the operator against injuries from the moving upper die 12, as could otherwise occur, for example, during the insertion of a workpiece 16 into open gap 22.

The functions of a bending press constructed in accordance with FIG. 1 during a normal operating mode for bending a flat plate are described in greater detail with reference to FIGS. 2*a*-2*f*.

Each of FIGS. 2*a*-2*f* shows in cross-section the lower die edge 18 of upper die 12, the upper die edge 20 of lower die 14, workpiece 16 supported thereon, the light beam 34 with its round cross-section, and a light receiver 32 which is illuminated by the light beam. At different points during a working cycle, different groups of individual CMOS-receiving elements of light receiver 32 are activated as is illustrated in the drawings. Such an activated group of receiving elements is shown in a speckled dark gray in the drawings. Only the active receiving elements are monitored for possible interruptions of light beam 34 for purposes of initiating a stopping operation, should that be required. The arrangement or pattern of the active receiving elements determines the cross-section of the protected zone 36.

The lower half of each of FIGS. 2*a*-2*b* is a timing diagram in which an arrow visually indicates several points of the bending press during an operating cycle.

FIG. 2*a* shows the beginning of an operating cycle. The upper die is at its beginning position at the upper dead point.

Light beam 34 illuminates the entire receiver 32 so that all of its receiving elements are active, and the protected zone has its maximum size.

As the operating cycle progresses, the upper die is lowered as shown in FIG. 2b. The size of the protected zone 36 remains unchanged until the size of opening gap 22 in the direction of tool movement has been reduced to that of protected zone 36 and the upper tool has reached the switching point. The upper tool can move relatively rapidly until then. In the event an object intrudes into protected zone 36, the upper die would be stopped within the protected zone.

In the event the die has moved sufficiently so that opening gap 22 is smaller than protected zone 36 in the direction of movement, that is, when the lower side of the protected zone has reached and traveled to below the upper surface of the workpiece, as is illustrated in FIG. 2c, a section 38 of receiver 32 is beneath workpiece 16. Section 38 of receiver 32 is deactivated as shown in FIG. 2c by light gray lines. Thus, the size of the protected zone 36 in the direction of tool movement is reduced to the size of opening gap 22.

The downward movement of upper die 12 continues at a lower closing speed which continuously reduces the size of protected zone 36 until it reaches the muting point, as illustrated in FIG. 2d. The muting point is defined as and is reached when the size of the opening gap has been reduced so that a finger can no longer extend into the gap, which in turn means that the moving die no longer poses a significant danger. At this point, the size of the gap is typically about 9 mm and all receiving elements of light receiver 32 are deactivated, as can be seen in FIG. 2d.

The downward motion of upper die 12 continues until it touches workpiece 16, as illustrated in FIG. 2e. This point is referred to as the "contact point" when the workpiece 16 becomes clamped between the upper and lower dies 12, 14. The operating cycle continues and comes to an end when workpiece 16 has been appropriately deformed, as is illustrated in FIG. 2f. Thereafter the upper die 12 is raised to its upper dead point, and a new operating cycle in accordance with FIGS. 2a-2f can begin.

The above-described method for securing bending press 10 and the required configuration of the sensors have the advantage that the opening gap between the upper die 12 and the workpiece 16 results in a protected zone 36 of greatest possible size during each of the operational phases of a work cycle as shown in FIGS. 2a-2f. When the opening gap 12 is sufficiently large, the size of protected zone 36 corresponds to that of receiver 32. When the opening gap 22 is smaller, the entire remaining opening gap is controlled in accordance with the present invention so that a danger of possible injury due to reaching into the opening gap can always be detected.

Since different workpieces 16 have differing dimensions, and especially different thicknesses, the switching point, the muting point and the contact point can occur at differing points in time during a work cycle. In one embodiment of the present invention, these points can be established by performing a test run, during which the motion sequences of the upper tool are automatically learned and then stored for future reference.

In accordance with another embodiment of the invention, the operation of the securing system and method is described for a different operating mode. As an example, FIGS. 3a-3f show a so-called box bending mode in which a box or box-shaped article 40 is being bent. In such an operating mode, a portion of the three-dimensional box can at times unavoidably intrude into light beam 34 during an operating cycle.

FIGS. 3a-3f show how the protected zone 36 can be adapted for such applications in accordance with the present invention.

FIG. 3a shows the position of lower edge 18 of upper die 12, of light beam 34, of receiver 32, and of protected zone 36 at the beginning of an operating cycle. FIG. 3a shows that even at that point a small portion of light beam 34 is covered by box 40. However, this has no influence on the operation of the press because the intrusion occurs outside the protected zone 36.

As the working cycle continues, box 40 begins to extend into protected zone 36, as shown in FIG. 3b. However, the safety device of the present invention recognizes this as a permitted intrusion and therefore deactivates one-half 36.1 of the protected zone. The other half 36.2 of the protected zone remains active.

Downward motion of upper die 12 continues until the opening gap has been reduced in size to that of protected zone 36 in the direction of movement. Depending on the height of the opening gap, a further section 38.2 of protected zone 36 becomes deactivated. This section 38.2 corresponds to the area of protected zone 36 which is beneath box 40 and overlies lower die 14. As the upper die 12 continues to be lowered, the remaining active protected zone becomes continuously smaller.

Figure 3D:
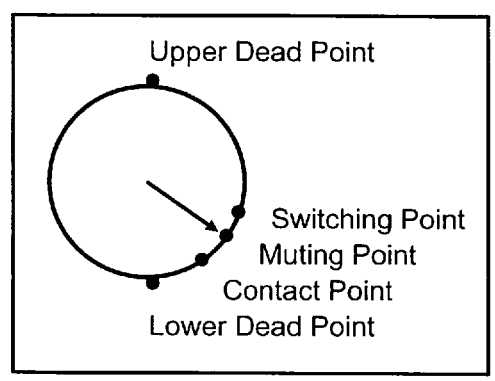

According to FIG. 3d, the upper die 12 continues to be lowered until it reaches the muting point, which corresponds to the muting point shown in FIG. 2d. From this point on, the entire protected zone 36 is deactivated.

In accordance with FIGS. 3e and 3f, the upper tool continues to be lowered to the contact point and until the box has been completely bent.

For this embodiment of the invention too, the thickness of the sheet metal, its upper surface and the corresponding switching, muting and contact points are initially learned with the help of an operational test run of the upper die for establishing these reference points.

For simple geometric forms of box 40, it is possible not to completely deactivate the half 36.1 of protected zone 36, but to continuously reduce the size of section 36.1 as well as of section 36.2 following the switching point. Other box configurations than those illustrated can of course be worked on in accordance with the present invention.

What is claimed is:

1. A method of securing a machine having first and second tool parts that define an opening gap between them, at least the first tool part being movable relative to the second tool part in a movement direction so that during an operating cycle the opening gap is gradually closed, the method comprising generating a protected zone so that it precedes the first tool part and extends over at least a portion of the opening gap in the direction of relative movement, monitoring one of an entire area of the protected zone that is transverse to the movement direction and a periphery of the area with an optoelectronic sensor and generating a danger signal in response to a breach of the protected zone, and when a size of the opening gap in the movement direction becomes smaller than the protected zone in the movement direction, continuously reducing the size of the protected zone in the movement direction of the first tool part so that during subsequent closing movements of the first tool part substantially the entire opening gap is within the protected zone.

2. A method according to claim 1 including, during subsequent closing movements, completely deactivating the protected zone after an extent of the protected zone in the movement direction has reached a predetermined minimum.

3. A method according to claim 1 including dividing a movement speed of the first tool part into a relatively faster, first closing speed and a subsequent, relatively slower second closing speed, and switching from the first closing speed to the second closing speed on the basis of a deceleration ramp or a remaining travel distance for the first tool part established during a preceding test run of the first tool part.

4. A method according to claim 1 including deactivating at least a portion of the protected zone as a function of the size and/or a geometrical shape of the workpiece.

5. A method according to claim 4 wherein deactivating occurs after a portion of the workpiece has entered the protected zone.

6. A method according to claim 4 including determining a position of an upper surface of the workpiece during a test run of the first tool part and then learning and memorizing the position of the upper surface as a contact point between the first tool part and the workpiece.

7. A method according to claim 1 wherein the machine comprises a bending press.

8. Apparatus for protecting a dangerous zone of a machine against unwanted entries into the zone comprising first and second tool parts mounted for relative movement of the first tool part in a closing direction towards the second tool part and defining an opening gap between the tool parts, an optoelectronic sensor for monitoring the opening gap including a light emitter for illuminating one of an entire area of the opening gap that is transverse to the closing direction and a periphery of the area with a light beam, a light receiver for receiving the emitted light, and a control unit for generating a danger signal when an intrusion into the protected zone is detected, the light emitter and the light receiver being configured so that when the opening gap becomes reduced as the first tool part moves in the closing direction, the protected zone is continuously reduced in the closing direction and so that during further movements of at least one of the first and second tool parts the entire opening gap is within the protected zone.

9. Apparatus according to claim 8 wherein the light beam has a cross-section at the light receiver which is greater than and completely illuminates the light receiver.

10. Apparatus according to claim 7 including means fixedly securing the sensor to the first tool part for movement with the first tool part during an operating cycle of the first tool part.

11. Apparatus according to claim 8 wherein the receiver comprises a location resolving receiver.

12. Apparatus according to claim 11 wherein the receiver comprises a CMOS-receiver defining a matrix.

\* \* \* \* \*